Aug. 26, 1958 P. DUFFING 2,849,571

TRIGGER MECHANISM FOR CIRCUIT BREAKERS

Filed Feb. 24, 1955 5 Sheets-Sheet 1

Inventor:

Paul Duffing

Aug. 26, 1958 P. DUFFING 2,849,571

TRIGGER MECHANISM FOR CIRCUIT BREAKERS

Filed Feb. 24, 1955 5 Sheets-Sheet 2

Inventor:

Paul Duffing

TRIGGER MECHANISM FOR CIRCUIT BREAKERS

Filed Feb. 24, 1955 5 Sheets-Sheet 3

Inventor:

Paul Duffing

Aug. 26, 1958 P. DUFFING 2,849,571

TRIGGER MECHANISM FOR CIRCUIT BREAKERS

Filed Feb. 24, 1955 5 Sheets-Sheet 4

Inventor:

Paul Duffing

TRIGGER MECHANISM FOR CIRCUIT BREAKERS

Filed Feb. 24, 1955 5 Sheets-Sheet 5

Inventor:

Paul Duffing

United States Patent Office 2,849,571

Patented Aug. 26, 1958

2,849,571

TRIGGER MECHANISM FOR CIRCUIT BREAKERS

Paul Duffing, Berlin-Siemensstadt, Germany, assignor to Siemens-Schuckertwerke Aktiengesellschaft, Berlin-Siemensstadt, Germany, a German corporation

Application February 24, 1955, Serial No. 490,299

Claims priority, application Germany February 27, 1954

25 Claims. (Cl. 200—109)

My invention relates to trigger mechanisms for locking and releasing circuit breakers, contactors and similar apparatus in which a movable part, biased by a kick-out force, is normally latched in position and is triggered for circuit-controlling motion by actuation of a releasing member. In a more particular aspect, my invention relates to trigger mechanism for high-voltage circuit breakers.

It is an object of my invention to provide a releasable latching device of great precision that affords a reliable and rapid triggering operation with the aid of a simple mechanism whose essential parts can readily be given a high-precision design and which minimizes detrimental friction during the initial stage of the triggering operation when such friction must be overcome by relatively weak triggering force.

Another object of my invention, akin to the foregoing, is to devise a circuit-breaker latching device in which the triggering operation involves substantially only rolling movements and virtually excludes sliding friction up to the moment when the much larger forces being triggered become effective.

Still another, more specific, object of the invention is to secure the triggering operation of the device with the aid of structural bodies, namely balls or rollers as used in anti-friction bearings, that are commercially available as high-precision articles of mass production, thus attaining the desired improvement with low-cost components.

It is also an object of my invention to provide a releasable latching device according to any of the preceding objects that can reliably be triggered by two or any desired number of mutually independent control magnitudes such as overload current, current or voltage failure, excessive voltage, or excessive temperature.

To achieve these objects and in accordance with a feature of my invention, I provide the latching device with two or more rolling bodies which, when in latching condition, rest against each other and against a stationary, rigid surface in labile or nearly labile equilibrium so that they form together a rigid abutment opposing the movement of the force-biased part to be latched; and I provide trigger means to move one or more of the rolling bodies beyond the equilibrium position thus causing the abutment to collapse, the rolling bodies being in rolling engagement with each other and with the adjacent force-applying or supporting surfaces of the device.

Figure 1:
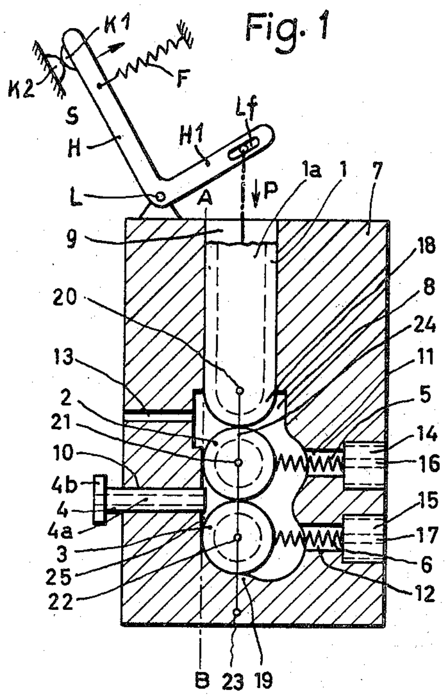
Figure 2:
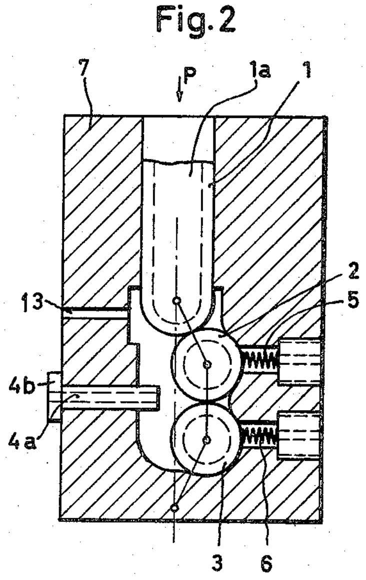
Figure 3:
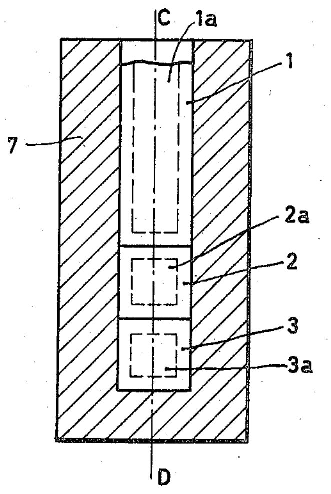
Figures 4, 5, 6, 7, 8, 9:
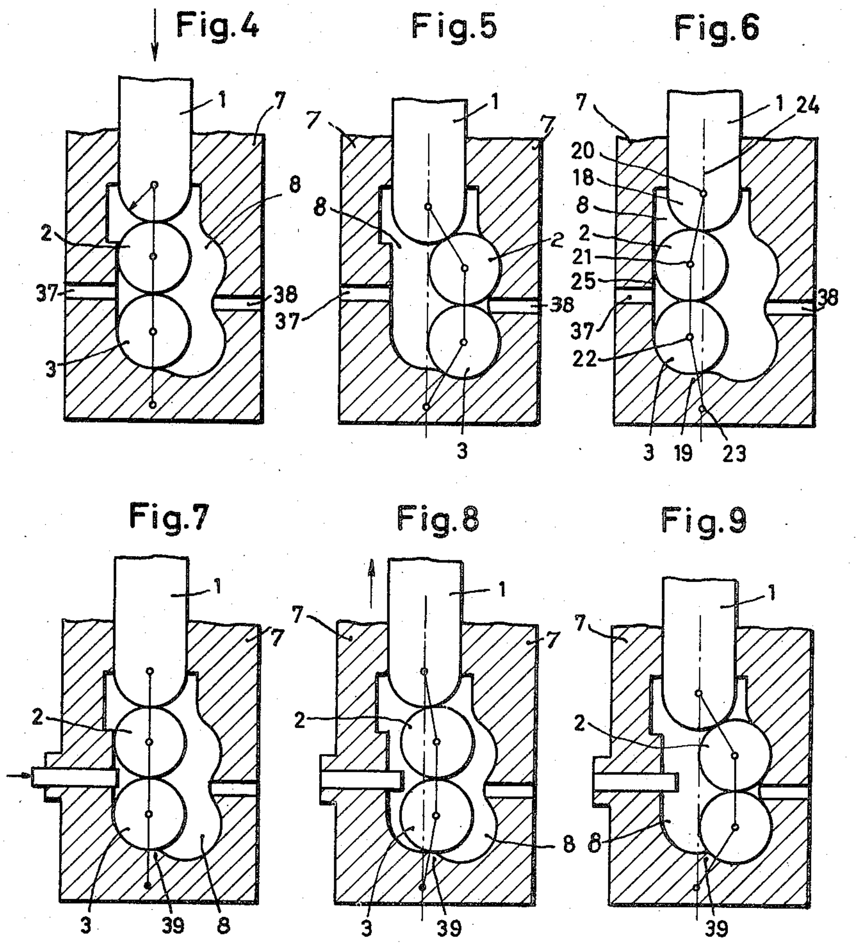
Figure 10:
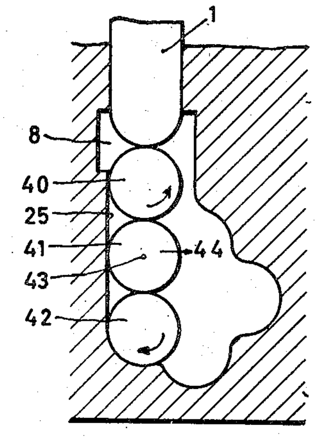
Figure 11:
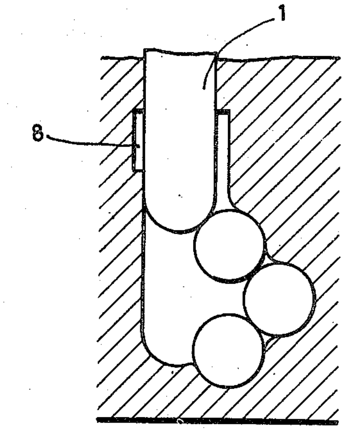
Figure 12:
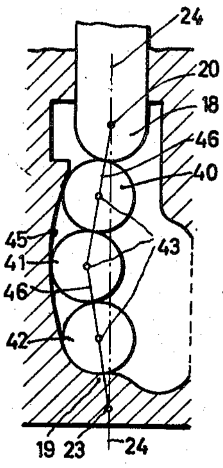
Figure 13:
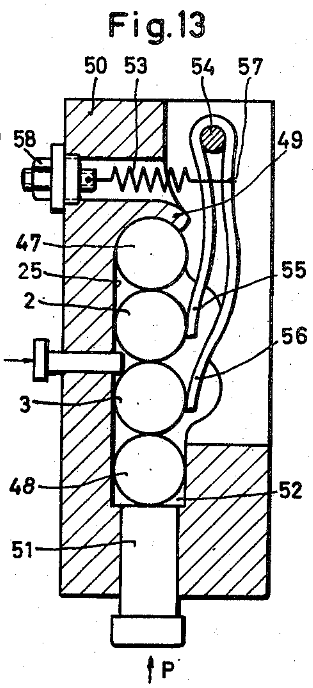
Figure 14:
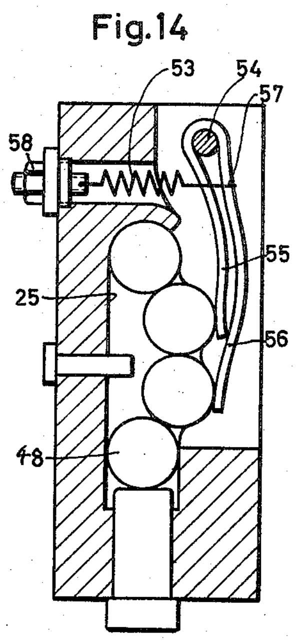
Figures 15, 16, 17:
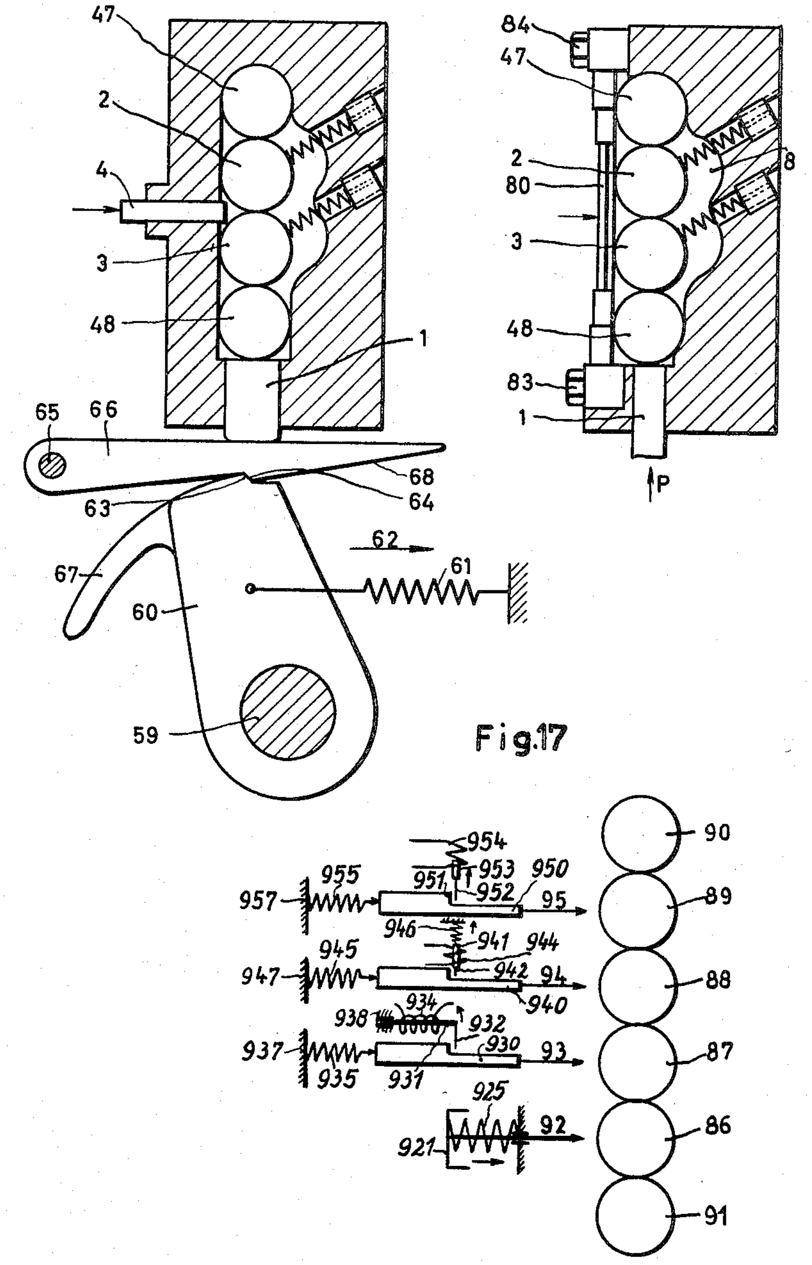
Figure 18:
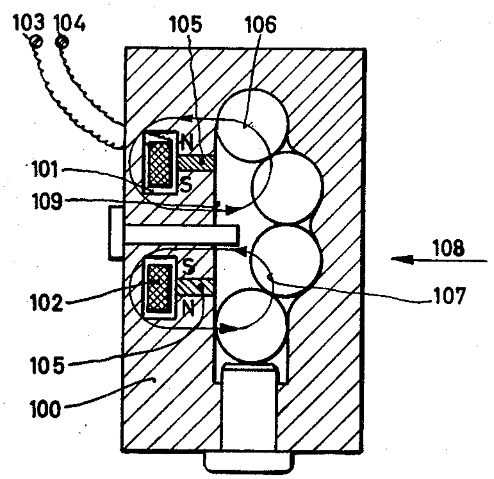
Figure 19:
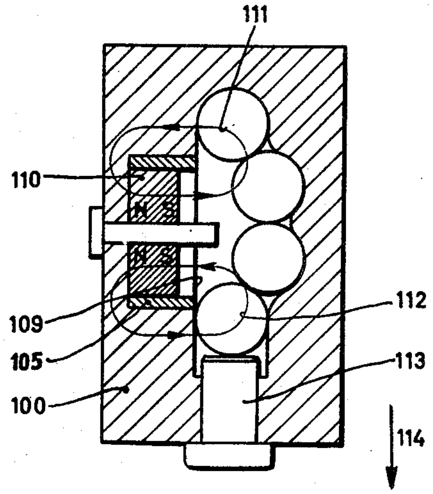

These and other features of the invention, set forth with particularity in the claims annexed hereto, will be apparent from, and will be described in, the following with reference to the drawings in which:

Fig. 1 is a vertical cross-sectional view taken along the line C—D of Fig. 3 showing, in unlocked condition, one embodiment of the invention, Fig. 2 is a view similar to that of Fig. 1 but showing the device in released condition, Fig. 3 is a cross-sectional view taken along the line A—B of Fig. 1, Figs. 4 and 5 show an alternative embodiment of the invention, wherein compressed air is used as the locking and releasing means, Fig. 6 shows an embodiment similar to that shown in Figs. 4 and 5 but modified for self-locking action, and Figs. 7, 8 and 9 show another self-locking embodiment, Figs. 10 and 11 show an embodiment of the invention utilizing three rolling members, and Fig. 12 shows another embodiment with three rolling members and self-locking action, Figs. 13 and 14 show an embodiment of the invention with four rolling members, two of which serve as end abutment means, Fig. 15 shows still another embodiment of the invention, wherein a modified actuating mechanism is used, Fig. 16 is a modification of the invention shown in Fig. 15, wherein triggering is effected by heat generated by current passing through a bimetallic strip, Fig. 17 is a schematic representation of an embodiment of the invention adapted to be triggered by any one of a plurality of magnitudes, and Figs. 18 and 19 show schematically an electromagnetically controlled device embodying the invention.

The device according to Figs. 1–3 consists essentially of three components. The first component is the locking and abuting mechanism formed of the part 1 to be locked, and two rolling bodies 2 and 3 consisting of cylindrical rollers. The second component is formed by the releasing and resetting device and comprises a releasing pin 4, and two springs 5 and 6. The third component is formed by a housing 7 with a chamber 8 and channels 9 to 13. The channels 9 through 12 serve for the reception or guidance of the part 1, the pin 4, spring 5 and spring 6 respectively. Channels 12 and 13 are enlarged and internally threaded at their outer ends to receive respective screws 14, 15 having respective axial bores 16, 17. The channel 13 is an air duct. The rolling bodies 2 and 3 rest against counterbearings 18 and 19 respectively. The counterbearing 18 is formed by the end of part 1. The counterbearing 19 is formed by the bottom wall of chamber 8. The device forms part of an electric overload breaker S with contact pins K1 and K2. Part 1 is linked with the contact piece K1 through a transmission consisting for instance, of a bell-crank lever H fulcrumed on a bearing L. The arm H1 of lever H has an elongated slot L*f* for guiding the part 1. The lever H is biased by a kick-out spring F which tends to open the breaker contacts but is prevented from operating by the part 1 as long as part 1 is kept in the locked position shown in Fig. 1. In this position the spring pressure represented by arrow P is imposed upon the part 1 and is transmitted through the rolling bodies 2 and 3 upon the counterbearing 19.

In the locked condition (Fig. 1) the two rolling bodies 2 and 3 rest against the side wall 25 of chamber 8. The center points of curvature 20–23, all of coacting roll-engagement surfaces, are then all in alignment as indicated by the line 24. The rolling bodies 2 and 3 subjected to the load P are thus in labile equilibrium. To prevent the rolling bodies 2, 3 under the pressure P from being forced toward the right, for instance by jarring or shocks, these bodies are forced against the side wall 25 by respective springs 5 and 6. The springs rest with their other ends against the screws 14 and 15. By turning the set screws 14 and 15 in the embodiment according to Fig. 1, the pressure exerted by the springs 5 and 6 can be regulated. There are other means of stabilizing the labile condition of the rolling bodies 2, 3, as will be described below with reference to the other embodiments.

Upon occurrence of excessive overload in the circuit to be protected by the breaker, the trigger pin 4 of the switch S is pushed toward the right. This causes the two bodies 2 and 3 to roll out of the equilibrium position toward the right in opposition to the compressional forces of springs 5 and 6. The abutment formed by the rolling bodies 2 and 3 collapses. Under the load of force P, part 1 now presses the bodes 2 and 3 into the position shown in Fig. 2. The releasing pin 4 only triggers the collapse which is automatically completed by the action of the spring loading P. During the collapsing performance the air from the right-hand side of the rolling bodies 2, 3 escapes from the chamber 8 through the air duct bores 16 and 17. On the left-hand side of bodies 2, 3 air is freely supplied into the chamber 8 through the air duct 13 and through an air duct 4*a* in trigger pin 4. The movement of pin 4 toward the right is limited by an outer shoulder 4*b*.

When the circuit breaker is reclosed, part 1 returns to its upper position as shown in Fig. 1 so that the springs 5 and 6 can urge the rolling bodies 2, 3 back into locking position and against the side wall 25.

The invention also relates to the design of the individual mechanism parts and to the design of the mechanism for securing the locking condition. According to one of these further features of the invention, the rolling bodies and counterbearings are made of hardened material, preferably steel. Their surfaces are ground and polished. As accurately as possible, the rolling bodies should lie parallel to each other, upon each other and against the counterbearing surfaces. To this end, the rolling bodies are guided by the housing walls so that they cannot move edgewise relative each other. Instead of providing cylindrical rollers as rolling bodies according to the illustrated embodiment, other bodies may according to another feature of the invention be used such as balls or rollers with non-circular, for instance, elliptical or oval cross section. Balls have the advantages over rollers of requiring no guiding means for the prevention of edging displacements. This is so because balls do not form line contact but only point contact with each other and with the counterbearings. It is further preferable to dimension the rolling bodies and their counterbearings in such a manner that their material is mechanically stressed up to the permissible limit of hardness. This has the result that the rolling bodies can be given very small sizes and have only a slight mass. This is of advantage particularly in cases where an extremely rapid triggering is required. The mass of the rolling bodies can also be reduced by making the rolling bodies hollow, for instance by the hollow spaces indicated at 1*a*, 2*a*, 3*a* in Figs. 1–3.

The means for locking and releasing need not necessarily be mechanical. Pneumatic locking and releasing means are also applicable, for instance. Figs. 4 to 6 show an embodiment in which compressed air is used for this purpose. The housing 7 has two bores 37 and 38. Fig. 4 shows the locked condition and Fig. 5 the released condition. Due to the fact that the rollers or rolling bodies and their counterbearings have ground surfaces, they form a tight seal with each other and with the housing. For triggering the device, compressed air is supplied through the duct 37. This forces the two rolling bodies 2, 3 toward the right out of their labile equilibrium position. The air pressure is only called upon to provide a triggering impulse so that the force imposed upon the part 1 can move the two rolling bodies 2, 3 into the releasing position according to Fig. 5. During the releasing movement of the two rolling bodies, air escapes from the right-hand side of the rolling bodies through the duct 38. For resetting the device to locked condition, compressed air is admitted through the duct 38. This forces the two rolling bodies back into the locking position. The air then escapes from the left-hand side of the two rolling bodies through the duct 37.

Fig. 6 shows another embodiment according to the invention for securing the rolling bodies 2, 3 in the locking position by means of self-locking action. The side wall 25 which forms an abutment in chamber 8 is located somewhat more to the left than shown in the preceding figures. The two rolling bodies 2, 3, therefore, are disposed toward the left from the axis of part 1 when abutting against the wall 25. As a result, the centers of curvature 21, 22 are likewise displaced toward the left. They are located at the left side of the line 24 that connects the center of curvature points 20, 23 of the respective counterbearings 18, 19.

Another modification of the mechanism for securing the rolling bodies 2, 3 in the locking position is schematically illustrated in Figs. 7–9. The bottom of chamber 8 is shaped to form a hump or threshold 39 which arrests the lower rolling body 3 in its locked position. During releasing operation, the body 3 rolls over the threshold 39 while somewhat lifting the part 1 as indicated by the arrow shown in Fig. 8.

Fig. 9 shows the released condition of the device. In this embodiment, compressed air is used for locking and releasing the device in the same manner as described with reference to the embodiment illustrated in Figs. 4–6.

According to Fig. 10, three rolling bodies 40, 41, 42 are located in the chamber 8 of the locking device. The three rolling bodies rest against the side wall 25. The spring for constraining the bodies 40, 41, 42 in the illustrated position and the releasing means of the device are not shown, being similar to those illustrated and described elsewhere in this disclosure. The releasing or triggering member, when actuated has the effect of forcing the roller 41 in the direction of the arrow 44. As a result, the two rolling bodies 40 and 42 roll in the directions of the illustrated arrows upon their counterbearings and upon the rolling body 41. In this case the rolling body 41 does not revolve about its axis 43. Fig. 11 shows the releasing position ultimately reached by the rolling bodies and by the released part 1.

In the embodiment according to Fig. 12, self-locking action of the three rolling bodies 40, 41, 42 in the locking position is achieved by having the three rolling bodies located against an arcuate surface 45. The surface is so shaped that the center points 43 of the individual rolling bodies are located behind the center line 24 connecting the center points of the two counterbearings. The center point of the middle rolling body 41 is displaced farthest to the left. The center points are located along the lines 46.

According to another feature of the invention, additional rolling bodies are inserted between the counterbearings and the rolling bodies which also participate in forming the locking abutment. This has the advantage that the counterbearings need not be particularly hard and need not be designed to any particular shape. An embodiment of this kind is schematically illustrated in Figs. 13 and 14. The rolling bodies 2 and 3 abut against the idle rolling bodies 47 and 48. The inserted rolling body 47 bears against a shell 49 formed by the housing 50. The surface of the shell is in intimate engagement with the body 47 over a large area. The inserted body 48 is carried upon the top of a slide pin 51 which corresponds to the part 1 described above with reference to the embodiment of Figs. 1–3.

The embodiment of Figs. 13 and 14 has the advantage that commercially available ball or roller bearings can readily be used since all rolling movements take place between these bodies and not at the counterbearings. The slide pin 51 is connected with a circuit breaker S (see Fig. 1) and, in the illustrated embodiment (Figs. 13, 14) it is pushed upwardly by the force P. The pin 51 extends upwardly into a recess 52 of the housing 50. The rolling body 48 is displaceable in recess 52 without clearance. A spring 53 acts upon a bracket pivotally mounted on a pivot pin 54. The bracket has two resilient arms 55 and 56. The end of arm 55 presses the rolling body 2 against the side wall 25, and the end of arm 56 forces the body 3 against side wall 25. The spring 53 has its end 57 in engagement with the exteriorly located bracket arm 56 and can be subjected to more or less tension by adjustment of a set screw 58, thus permitting a regulation or adjustment of the pressure exerted by the bracket arms 55, 56 upon the rolling bodies 2, 3. The device operates otherwise in the same manner as the embodiments previously described.

Fig. 15 illustrates another embodiment shown in conjunction with a circuit-breaker part to be latched. The shaft 59 of the circuit breaker carries a latch arm 60 which is biased by a kick out spring 61 tending to pull the latch arm 60 in the direction of the arrow 62. The arm 60 has a latch nose 63 abutting against a catch shoulder 64 of a latch lever 66 rotatable about a pivot pin 65. The individual parts of the locking and releasing device proper are denoted by the same respective reference numerals as used in Figs. 1 and 2. The device operates as follows:

As soon as the releasing impulse is received, the trigger pin 4 forces the two rolling bodies 2, 3 out of their position of equilibrium so that the abutment for part 1 collapses under pressure exerted by the spring 61. This comes about as follows: As mentioned, the spring 61 pulls the arm 60 toward the right. The mutually engaging faces of the nose 63 and shoulder 64 are so inclined that the lever 66 is normally urged in the upward direction. Such movement, however, is prevented by the fact that part 1, locked by the rolling bodies, cannot yield. However, when the abutment formed by the rolling bodies collapses, the spring 61 becomes effective to move the lever 66 and the part 1 in the upward direction.

The arm 60 has an extension 67. In the released condition of the locking device, the extension 67 rests against the surface 68 of the latch lever 66 and thus keeps the lever 66 in raised position. The resetting of the device is effected in the same manner as in the above-described embodiments. In the embodiment of Fig. 15, the part 1 is relieved of lateral pressure by the intermediate lever 66; such lateral pressure would be imposed by part 60 if it rested directly upon the part 1.

In the embodiments so far described, the releasing operation is initiated either by a trigger pin 4 or by means of compressed air. However, the invention is not limited to the use of these particular means. It is also possible to effect the release by various other means as may be best suitable for a particular application. The releasing means chosen may be dependent, for instance, upon which operating condition magnitude is to be most effective for triggering the circuit breaker.

Accordingly, the releasing operation may be controlled by temperature responsive deformation. An embodiment of this kind is illustrated in Fig. 16.

As shown in Fig. 16, a bimetal strip 80 is provided for triggering the releasing operation. The bimetal strip 80 forms a side wall of the chamber 8. The rolling bodies 2, 3 bear against this wall. The bimetal strip 80 is connected by means of terminals 83, 84 with the electric circuit to be protected. With increasing temperature, the bimetal strip 80 gradually deflects toward the right and presses the two rolling bodies 2, 3 out of their position of labile equilibrium. The bimetal strip, however, merely triggers the releasing operation. This operation is then automatically performed and completed by the force P acting upwardly upon the slide pin 1.

In the embodiment schematically illustrated in Fig. 17, more than three rolling bodies are provided for forming a rigid locking abutment. This offers the possibility that a plurality of operating magnitudes may be utilized for controlling the triggering operation. In the embodiment of Fig. 17, four rolling bodies 86 to 89 are disposed between counterbearings formed by stationary rolling bodies 90 and 91. The stationary bodies 90 and 91 are located and secured in a chamber of the device in a manner similar to that described with reference to bodies 47 and 48 in Figs. 13 and 14. Assigned to each individual rolling body 86—89 is a trigger device represented schematically by the respective arrows 92 to 95. Each trigger device may comprise a trigger pin similar to pin 4 in Fig. 1 as described above.

When, for instance, the operating magnitude controlling the operation of trigger pin 93 exceeds the desired, predetermined value, the device is triggered by displacement of the rolling body 87 in the manner described in the foregoing. If another operating magnitude, controlling for instance the releasing pin 94, departs from its pre-adjusted range or limit, the pin 94 triggers the rolling body 88 out of the locking position. Consequently, a device of this kind permits controlling the releasing operation in dependence upon a plurality and mutually independent operating magnitudes or conditions. Some examples of such a selective triggering operation are described below.

The releasing pin 92, for instance, may be actuated by a push button at the choice of an attendant. The releasing pin 93 may be operated by a bimetal strip. The releasing pin 94 may operate by a zero-current coil and the releasing pin 95 may operate in dependence upon response of an overload current coil. In the embodiment for releasing the device in response to overload current a pulse transmitting tappet 950 is provided with a catch 951 engaged by a latch pin 952 which is secured to a magnet core 953 to be controlled by a magnet coil 954. Coil 954 is directly or indirectly connected to the electric circuit under supervision. The releasing tappet 950 is biased by a pressure spring 955 which bears against an abutment 957 and tends to force the tappet 950 in the direction of the arrow 95. As soon as the current exceeds the permissible limit value, the magnet core 953 is attracted by the coil 954. This releases the trigger tappet 950 so that the spring 955 can press the rolling body 89 out of the locking condition and thus cause locking abutment to collapse.

The device for triggering in response to zero-current has a similar design. A magnet core 941 is biased by a tension spring 946. The current under supervision flows through the coil 944. Normally, that is when sufficient current flows through coil 944, the coil holds the core 941 in locked position against the pulling force of spring 946 so that latch pin 944 maintains the tappet 940 in the illustrated inactive position. When the current is reduced to zero value, coil 944 loses its excitation and the spring 946 becomes effective to release the tappet 940 so that the spring 945 can force it against the rolling body 88. The abutment formed by the rolling bodies then collapses to actuate the circuit breaker.

The device for temperature or heat responsive triggering shown in Fig. 17 comprises a bimetal strip 931 which is rigidly mounted at 938. The current to be supervised flows directly or indirectly through a heating coil 934. When the bimetal strip 931, due to excessive heating, bends upwardly in the direction of an arrow, the latch pin 932 is withdrawn from the trigger tappet 930 and the spring 935, bearing against a rigid abutment 937, becomes effective to impel the tappet 930 against the rolling body 87 for collapsing the locking abutment.

The fourth triggering device shown in Fig. 17 is a push button 921 that can be depressed by the attendant in opposition to the force of a spring 925, thereby forcing the rolling body 86 out of the locking position.

It will be recognized from the embodiment described in the foregoing, that a single releasing or triggering member (4) may be provided for action upon several rolling bodies (2, 3) as shown, for example, in Fig. 1. In this case both rolling bodies are subjected to triggering impact by the common trigger member. The substantially simultaneous impacting of both rolling bodies is designed to bring about a speedier collapse, retraction, or relapsing of the abutment formed by the rolling bodies. Where only one of the rollable bodies is impacted there is a tendency for the other to resist translatory movement.

Momentary rotary motion thereof may or does take place. However, where this consideration is not given paramount weight it suffices if only one of the two rolling bodies is subjected to triggering impact by the releasing member, for instance only the upper of the two rolling bodies shown in Fig. 1, although this particular modification is not specifically illustrated in the drawings.

In a device with three rolling bodies that cooperate to form the rigid but collapsible abutment, it suffices to apply triggering impact only upon the middle rolling body (for instance upon body 41 in Fig. 10).

According to another feature of the invention, the rolling bodies may also be secured in their locking abutment position by means of magnetic forces. Such magnetic forces may additionally serve for returning the rolling bodies from the released position to the locking position.

Trigger devices of this type are shown in Figs. 18 and 19. According to Fig. 18, the housing 100 has an annular cavity 101 which contains an excitation winding 102 whose end leads 103, 104 are to be connected to a current source. The housing 100 consists of magnetizable material. It encloses a ring 105 of non-magnetic material, for instance brass. The other components of the device correspond to those described previously, and shown for instance in Fig. 14. When the winding 102 is energized, the magnetic circuits indicated in Fig. 19 at 106 and 107 will exist with the effect of producing positive and negative magnetic poles at N and S. The magnetic forces have the tendency to pull the bodies in the direction of the arrow 108 toward the stop wall 109. When the slide pin 113 is moved in the direction of the arrow 114, due to operation of the circuit breaker, the rollable bodies are free to move and are then forced by the magnetic effect to move into the blocking position.

The embodiment of Fig. 19 differs from that of Fig. 18 merely by the fact that the electromagnet is substituted by a permanent magnet 110. The permanent magnet is of annular shape, its poles N and S produce two magnetic flux circuits 111 and 112 which pull the rolling bodies against the surface 109 as soon as the slide member 113, during actuation of the circuit breaker, is moved in the direction of the arrow 114 and thus affords sufficient space for movement of the rollable bodies.

It will be obvious to those skilled in the art upon a study of the various modifications illustrated and described in this disclosure that the invention can be practicalized in many embodiments other than those particularly described without departing from the spirit and scope of the invention as defined by the following claims.

I claim:

1. A lock and release mechanism for circuit breakers and the like, comprising a housing having a cavity, an opening in said housing communicating with said cavity, a switch part slidably disposed for linear motion in said opening, said cavity having a stationary bottom surface opposite said opening and having stationary stop points aligned substantially perpendicular to said bottom surface, resilient means applying inwardly-directed pressure on said switch part, a plurality of rollable bodies normally aligned in labile equilibrium between the inner end of said switch part and said bottom surface and contacting said stop points when so aligned, and means to displace said rollable bodies from their positions of labile equilibrium, said cavity having means serving to delimit the extent of displacement movement of the bodies, and means applying a restoring force to return the bodies to their positions of labile equilibrium, said displacement being assisted by the pressure of said resilient means.

2. A trigger mechanism for circuit breakers and the like, comprising a supporting structure, a part to be latched, said part being movable and biased in a given direction relative to said structure, said structure having a stationary surface transverse to said direction and a stationary stop substantially parallel to said direction, a plurality of rollable bodies in rolling engagement with each other and with said part and said surface, said bodies normally being in contact with said stop and forming a column in substantially labile equilibrium so as to prevent said part from moving in said direction, springs disposed between said respective bodies and said structure to urge said bodies toward said stop, and trigger means opposing said springs for moving said bodies away from said stop to collapse said column, said collapsing being assisted by force applied columnwise by the biased part.

3. A trigger mechanism for circuit breakers and the like, comprising a supporting structure, a part to be latched, said part being movable and biased in a given direction relative to said structure, said structure having a stationary surface transverse to said direction and a stationary stop substantially parallel to said direction, a plurality of rollable bodies in rolling engagement with each other and with said part and said surface, said bodies normally being in contact with said stop and forming a column in substantially labile equilibrium so as to prevent said part from moving in said direction, said bodies when forming said column having respective axes displaced laterally toward said stop relative to the axis of movement of said part, whereby the biasing force of said part exerts a lateral force component upon said bodies to urge them toward said stop, trigger means for moving said bodies away from said stop to collapse said column, means, provided by the structure to delimit the extent of displacement of said bodies by said trigger means, and means applying restoring force to return the bodies to reform said column, said collapsing being assisted by force applied columnwise by the biased part.

4. A lock and release mechanism for circuit breakers and the like, comprising a housing member having a cavity, an opening in said housing communicating with said cavity, a part slidably disposed for linear motion in said opening, said cavity having a bottom opposite said opening and a side wall substantially perpendicular to said bottom, resilient means applying inwardly-directed pressure on said part, a plurality of rollable bodies normally forming a column in substantially labile equilibrium between said part and said bottom and contacting said side wall, said bottom wall having a hump portion operative to maintain said rollable bodies in contact with said wall, means to displace at least one of said rollable bodies from its position of labile equilibrium and thereby permit sliding motion of said part, said cavity having means which is disposed to delimit the extent of displacement of the rollable bodies, and means applying restoring force to return at least said one of the bodies to reform the column.

5. A lock and release mechanism for circuit breakers and the like, comprising a housing structure having a cavity, an opening in said housing structure communicating with said cavity, a part slidably disposed for linear motion in said opening, the housing member having a stationary end wall opposite said opening, an elongated swingably-mounted latch lever having a surface portion in contact with the outer end of said part, a rotatably-mounted latch cam having a cam surface in engagement which a surface portion of said latch lever opposite said surface portion, spring means urging said latch cam in the engaging direction with respect to said latch lever, a plurality of rollable bodies normally constrained in end-to-end disposition between the inner end of said part and said stationary end wall, said rollable bodies so normally disposed being in labile equilibrium, trigger means to displace at least one of said rollable bodies from its position of labile equilibrium and thereby permit sliding motion of said part, means provided by the structure to delimit the extent of displacement of the rollable bodies by the trigger means, and means applying restoring force to return the bodies to said end-to-end labile equilibrium disposition, said displacement by the trigger means being arrested by force applied in the end-to-end direction by said spring means.

6. A trigger mechanism, particularly for high voltage circuit breakers and the like, comprising a supporting structure, a part to be latched, said part being movable and biased in a given direction relative to said structure, said structure providing a stationary surface transverse to said direction, a plurality of rollable bodies in rolling engagement with each other, one thereof being in rolling operative engagement with said part and another with said surface, said bodies normally being arranged between said part and said surface in substantially labile equilibrium to form together a rigid abutment for latching said part from moving in said direction, and release means adapted to move at least one of said bodies transverse to said direction to collapse said abutment for releasing said part, said structure further providing two opposed stationary surfaces disposed in a direction longitudinal of the direction in which the part to be latched is biased, said opposed surfaces providing lateral support for the rollable bodies and delimiting the extent of to and fro transverse movement thereof, and means applying a restoring force to return the said bodies transversely to restore the said rigid abutment, the biased movement of said part to be latched being longitudinal of the rigid abutment whereby it serves to apply an assisting longitudinal force to aid in speeding collapse of said abutment.

7. In a trigger mechanism according to claim 6, said trigger means comprising a plurality of trigger devices coactive with said respective bodies, said trigger devices being operable independently of each other for selectively collapsing said abutment by displacement of respectively different ones of said bodies.

8. In a trigger mechanism according to claim 6, said bodies consisting of magnetizable material, and said means applying a restoring force comprising a magnet having a field in which said bodies are disposed.

9. A trigger mechanism particularly for high voltage circuit breakers and the like, comprising a supporting structure, a part to be latched, said part being movable and biased in a given direction relative to said structure-said structure providing a stationary surface transverse to said direction, a plurality of rollable bodies in rolling engagement with each other, one thereof being in rolling engagement with said part and another with said surface, said bodies normally being arranged between said part and said surface in substantially labile equilibrium to form together a rigid abutment for latching said part from moving in said direction, and release means adapted to move at least one of said bodies transverse to said direction to collapse said abutment for releasing said part, said structure further providing two opposed stationary surfaces disposed in a direction longitudinal of the direction in which the part to be latched is biased, said opposed surfaces providing lateral support for the rollable bodies and delimiting the extent of to and fro transverse movement thereof, and means applying a restoring force to return the said bodies transversely to restore the said rigid abutment, the biased movement of said part to be latched being longitudinal of the rigid abutment whereby it serves to apply an assisting longitudinal force to aid in speeding collapse of said abutment, said two opposed longitudinally directed surfaces being designated a first opposed surface and a second opposed surface, the second being the surface which supports and delimits the extent of movement of the rolling bodies after collapse of the abutment, said second surface having curvatures formed to receive part of the surface of at least two of the rolling bodies.

10. A trigger mechanism, particularly for high voltage circuit breakers and the like, comprising a supporting structure, a part to be latched, said part being movable and biased in a given direction relative to said structure, said structure providing a stationary surface transverse to said direction, a plurality of rollable bodies in rolling engagement with each other, one thereof being in rolling operative engagement with said part and another with said surface, said bodies normally being arranged between said part and said surface in substantially labile equilibrium to form together a rigid abutment for latching said part from moving in said direction, and release means adapted to move at least one of said bodies transverse to said direction to collapse said abutment for releasing said part, said structure further providing two opposed stationary surfaces disposed in a direction longitudinal of the direction in which the part to be latched is biased, said opposed surfaces providing lateral support for the rollable bodies and delimiting the extent of to and fro transverse movement thereof, and means applying a restoring force to return the said bodies transversely to restore the said rigid abutment, the biased movement of said part to be latched being longitudinal of the rigid abutment whereby it serves to apply an assisting longitudinal force to aid in speeding collapse of said abutment, said release means being designed to move two of the rolling bodies substantially simultaneously to cause a speedy collapse of the said abutment.

11. A trigger mechanism as defined in claim 10 in which the means applying a restoring force comprises compression springs mounted upon the said second opposed surface.

12. A trigger mechanism comprising a housing, said housing having two side walls and two end walls, the housing having a longitudinally extending bore in an end wall, longitudinally sliding means to be latched situated at least partly in said bore, means to bias the means to be latched in the direction inward of said bore, a plurality of rollable bodies in series rolling engagement with each other, said bodies being normally in series contact and normally providing in conjunction with the housing a longitudinally extending rigid abutment in said housing which prevents the said sliding means for moving in the direction inward of said bore, said side walls delimiting the extent of to and fro transverse movement of the rollable bodies, one end of said abutment normally being prevented from moving longitudinally by a stationary transverse surface of the housing, release means adapted to move at least one of said bodies transversely to the longitudinal direction to relapse the rigidity of the abutment to permit the said sliding means, which is defined as to be latched, to move in the direction inward of the bore under the urging of the biasing means, and means applying restoring force to return the bodies to reform the abutment.

13. A trigger mechanism as defined in claim 12 in which the two side walls provide two inner opposed longitudinally directed surfaces, one of which serves as lateral support for the said rigid abutment, and the other of which is grooved to receive at least part of the curved surfaces of at least two of the rollable bodies when the rigidity of the abutment is relapsed.

14. A trigger mechanism as defined in claim 12 in which there are at least four of the said rollable bodies in series contact, the two terminal bodies of the series being substantially constrained by walls of the housing from translatory transverse motion.

15. A trigger mechanism as defined in claim 12 in which there are provided at least three of the said rollable bodies in series contact, one terminal body of the series being substantially constrained from translatory motion transversely.

16. A trigger mechanism as defined in claim 12 in which the release means is designed to move two of the rolling bodies substantially simultaneously to cause a speedier relapsing of the abutment.

17. A trigger mechanism as defined in claim 6 in which the rollable bodies are light hollow bodies.

18. In a release mechanism the improvement comprising a housing structure, at least three rollable bodies in the housing in series contact with each other and normally forming a release preventing abutment, force means normally urging the bodies into series contact with each other in a direction longitudinal of the abutment, release means adapted to apply a transverse force to move one or more intermediate ones of the bodies transversely to relapse the abutment with the assistance of the longitudinally directed force means, said housing structure providing stops delimiting the to and fro transverse movement of said one or more bodies, the rollable bodies including at least two terminal bodies, one of which terminal bodies is subjected to urging of the longitudinal force means that is held from substantial transverse translatory motion with respect to the housing, the other of which is held from substantial longitudinal displacement outwardly of the abutment and from substantial transverse translatory motion with respect to the housing, and means applying restoring force to return the said intermediate one or more bodies to reform the abutment.

19. A release mechanism as defined in claim 18 in which there are at least four rollable bodies in series contact, at least two non-terminal bodies of which are free to move in one transverse direction to permit said relapsing of the abutment.

20. A release mechanism as defined in claim 19 in which the release means is adapted to apply transverse force substantially simultaneously to two of the said bodies which are free to move in a transverse direction.

21. A release mechanism as defined in claim 19 in which individual release means are provided for at least two of the bodies free to be moved in a transverse direction.

22. A release mechanism as defined in claim 19 in which a longitudinal wall of the housing is at least in part comprised of a thermo-responsive element which normally provides lateral support for at least two of the non-terminal bodies, said thermo-responsive element comprising the said release means.

23. A release mechanism as defined in claim 18 in which a longitudinal inner wall of the housing is shaped to provide a recess to receive part of and only part of at least one non-terminal rollable body upon relapse of the abutment.

24. A release mechanism as defined in claim 19 in which a longitudinal inner wall of the housing is shaped to provide at least two recesses to receive part of and only part of at least two non-terminal rollable bodies upon relapse of the abutment.

25. A release mechanism as defined in claim 18 in which at least the non-terminal body or bodies is magnetic, and a magnet which serves as said release means.

References Cited in the file of this patent

UNITED STATES PATENTS

| | | |
|---|---|---|
| 423,912 | Diehl | Mar. 25, 1890 |
| 1,040,309 | Gordon | Oct. 8, 1912 |
| 1,146,326 | Gordon | July 13, 1915 |

FOREIGN PATENTS

| | | |
|---|---|---|
| 280,113 | Italy | Nov. 29, 1930 |
| 615,187 | Great Britain | Jan. 3, 1949 |